United States Patent
Eo et al.

(10) Patent No.: US 8,663,057 B2
(45) Date of Patent: Mar. 4, 2014

(54) AUTOMATED MANUAL TRANSMISSION

(75) Inventors: Soon Ki Eo, Ansan-si (KR); Il Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/537,607

(22) Filed: Jun. 29, 2012

(65) Prior Publication Data
US 2013/0123054 A1 May 16, 2013

(30) Foreign Application Priority Data
Nov. 11, 2011 (KR) .......................... 10-2011-0117519

(51) Int. Cl.
*F16H 3/46* (2006.01)
(52) U.S. Cl.
USPC ................................ 475/302; 475/5; 475/219
(58) Field of Classification Search
USPC ..................... 475/5, 150, 207, 209, 218, 219, 475/280–291, 302
See application file for complete search history.

(56) References Cited

U.S. PATENT DOCUMENTS

| 4,523,493 A * | 6/1985 | Wei.beta. ........................ 475/205 |
| 4,614,133 A * | 9/1986 | Nerstad et al. ................. 475/218 |
| 2008/0064550 A1* | 3/2008 | Holmes .............................. 475/5 |
| 2010/0029436 A1* | 2/2010 | Katsuta et al. ..................... 477/5 |
| 2010/0184549 A1* | 7/2010 | Sartre et al. ........................ 475/5 |

* cited by examiner

*Primary Examiner* — Erin D Bishop
*Assistant Examiner* — Huan Le
(74) *Attorney, Agent, or Firm* — Morgan, Lewis & Bockius LLP

(57) ABSTRACT

An automated manual transmission which improves merchantability of a vehicle by preventing a shift feeling deterioration phenomenon and forming a smooth and stable shift feeling by removing a torque decrease phenomenon caused during a shift by dualizing a transmission path of power supplied to drive the vehicle during the shift through a relatively simple and compact configuration while using a synchro-mesh type shift mechanism.

6 Claims, 6 Drawing Sheets

AUTOMATED MANUAL TRANSMISSION

CROSS-REFERENCE TO RELATED APPLICATION

The present application claims priority of Korean Patent Application Number 10-2011-0117519 filed Nov. 11, 2011, the entire contents of which application is incorporated herein for all purposes by this reference.

BACKGROUND OF INVENTION

1. Field of Invention

The present invention relates to an automated manual transmission, and more particularly, to a configuration of an automated manual transmission configured to improve a shift feeling deterioration phenomenon causing a feeling of being pulled during a shift.

2. Description of Related Art

An automated manual transmission can provide convenience similar to an automatic transmission as a shift is automatically made by an actuator while a vehicle is driven and contribute improvement of fuel efficiency of the vehicle with more excellent power transmission than the automatic transmission.

However, in the case of the automated manual transmission based on a synchro-mesh type shift mechanism, a moment when power is broken is required even during the shift automatically made by the actuator, and as a result, a shift feeling deterioration phenomenon as if the vehicle is pulled backward is accompanied by the decrease in torque caused by a transient power failure.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an automated manual transmission configured to improve merchantability of a vehicle by preventing a shift feeling deterioration phenomenon and forming a smooth and stable shift feeling by removing a torque decrease phenomenon caused during a shift by dualizing a transmission path of power supplied to drive the vehicle during the shift through a relatively simple and compact configuration while using a synchro-mesh type shift mechanism.

Various aspects of the present invention provide for an automated manual transmission, including a first planetary gear device and a second planetary gear device that include rotary elements receiving rotary force from an engine, respectively and are placed on a concentric axis, an input shaft provided to receive the rotary force from the first planetary gear device, an output shaft placed in parallel to the input shaft, a plurality of shift step gear pairs mounted on the input shaft and the output shaft to form different shift ratios by making a pair, a plurality of synchronization devices provided to connect and disconnect any one shift step gear among the shift step gear pairs to the input shaft or output shaft, a bypass device provided to switch a state in which the rotary force from the second planetary gear device to the output shaft, a first friction element provided to restrict rotation of rotary elements other than the rotary elements connected to the engine and the input shaft, respectively among the rotary elements of the first planetary gear device, and a second friction element provided to restrict rotation of rotary elements other than the rotary elements connected to the engine and the output shaft, respectively among the rotary elements of the second planetary gear device.

Various aspects of the present invention provide for an automated manual transmission in which placing shift step gears forming each shift step on the input shaft and the output shaft which are parallel to each other while making a pair and a synchro-mesh type synchronization device are provided, including a first planetary gear device installed to transmit power from an engine to the input shaft, a second planetary gear device coaxially placed adjacent to the first planetary gear device and installed to transmit the power from the engine directly to the output shaft, a first friction element configured to be installed to control rotation of one rotary element of the first planetary gear device to control the power transmitted to the output shaft through the first planetary gear device, a second friction element configured to be installed to control rotation of one rotary element of the second planetary gear device to control the power transmitted to the output shaft through the second planetary gear device, and a bypass device installed to switch a power transmission state between the second planetary gear device and the output shaft.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
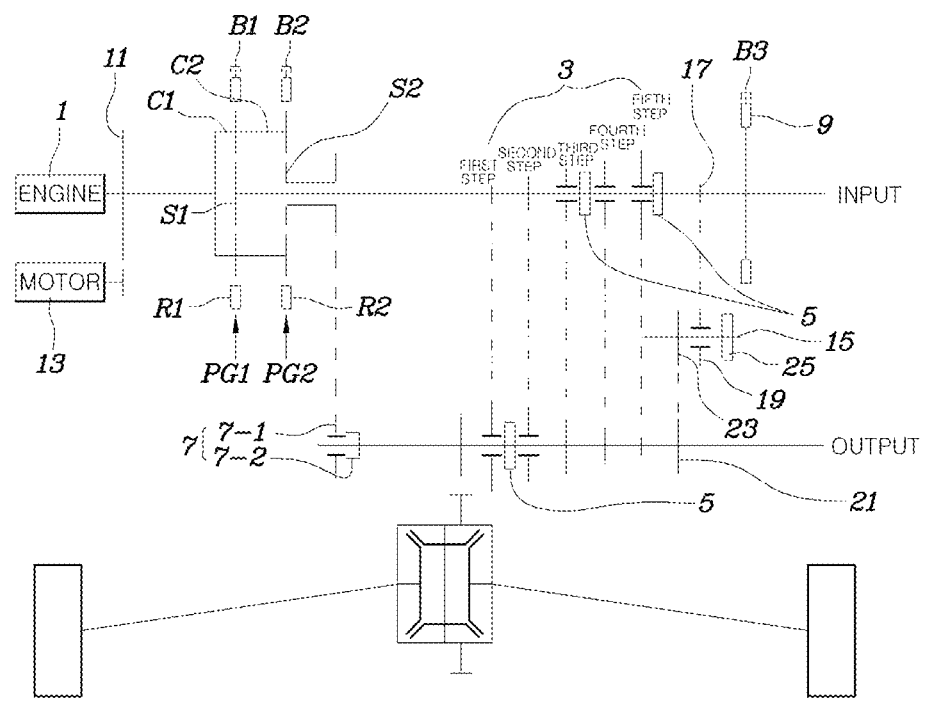
FIG. 1 is a diagram illustrating a configuration of an exemplary automated manual transmission according to the present invention.

It should be understood that the appended drawings are not necessarily to scale, presenting a somewhat simplified representation of various features illustrative of the basic principles of the invention.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, an automated manual transmission according to various embodiments of the present invention includes a first planetary gear device PG1 and a second planetary gear device PG2 that include rotary elements receiving rotary force from an engine 1, respectively and are placed on a concentric axis, an input shaft INPUT provided to receive the rotary force from the first planetary gear device PG1, an output shaft OUTPUT placed in parallel to the input shaft INPUT, a plurality of shift step gear pairs 3 mounted on the input shaft INPUT and the output shaft OUTPUT to form different shift ratios by making a pair, a plurality of synchronization devices 5 provided to connect and disconnect any one shift step gear among the shift step gear pairs 3 to the input shaft INPUT or output shaft OUTPUT, a bypass device 7 provided to switch a state in which the rotary force from the second planetary gear device PG2 to the output shaft OUTPUT, a first friction element B1 provided to restrict rotation of rotary elements other than the rotary elements connected to the engine 1 and the input shaft INPUT, respectively among the rotary elements of the first planetary gear device PG1, and a second friction element B2 provided to restrict rotation of rotary elements other than the rotary elements connected to the engine 1 and the output shaft OUTPUT, respectively among the rotary elements of the second planetary gear device PG2.

That is, when maintaining a mechanism of the automated manual transmission in which a shift is made by placing shift step gears forming each shift step on the input shaft INPUT and the output shaft OUPUT which are parallel to each other while making a pair and operating the corresponding shift step gears by using a synchro-mesh type synchronization device 5, the first planetary gear device PG1 installed to transmit power from the engine 1 to the input shaft INPUT and the second planetary gear device PG2 installed to transmit the power from the engine 1 directly to the output shaft OUPUT are additionally provided, and as a result, a power transmission path in which the power from the engine 1 reaches the output shaft OUPUT may be dualized.

In the present invention, as the power from the engine 1 can be transmitted to the output shaft OUTPUT through two paths as described above, the path in which the power is transmitted to the output shaft OUTPUT through the first planetary gear device PG1 and each shift step gear is used as a power transmission path during general driving and the power transmission path in which the power is transmitted to the output shaft OUTPUT through the second planetary gear device PG2 enables the power from the engine 1 to the output shaft OUTPUT to prevent torque from being reduced during shifting in the related art.

A rotation control plate 9 that rotates integrally with the input shaft INPUT is provided on the input shaft INPUT and a third friction element B3 provided to control the rotation of the input shaft INPUT by applying friction force to the rotation control plate 9 is provided on the input shaft INPUT.

The rotation control plate 9 and the friction element B3 enable a smooth and rapid synchronization operation by appropriately controlling a rotational speed of the input shaft INPUT during shifting to ensure rapid and silent shifting.

A ring gear 11 for starting the engine 1 and forming rotary inertial force is provided on a rotational shaft of the engine 1 and a motor 13 is connected to the ring gear 11.

The motor 13 operates to perform a similar function as a start motor in the related art driven when the engine 1 is started and the ring gear 11 also serves to perform a function of a flywheel of the engine 1. In particular, since the first planetary gear device PG1 and the second planetary gear device PG2 are connected to the rotational shaft of the engine 1, the rotary inertial force required for the function of the flywheel of the engine is substantially provided even by the first planetary gear device PG1 and the second planetary gear device PG2. Therefore, even though the size of the ring gear 11 is relatively smaller, the motor 13 may sufficiently perform the function as the flywheel.

The first planetary gear device PG1 is configured by a single-pinion simple planetary gear device including a first sun gear S1, a first carrier C1, and a first ring gear R1 and the second planetary gear device PG2 is configured by a single-pinion simple planetary gear device including a second sun gear S2, a second carrier C2, and a second ring gear R2. The first carrier C1 and the second carrier C2 are connected to the engine 1, the first sun gear S1 is connected to the input shaft INPUT, and the second gear S2 is connected to the output shaft OUTPUT through the bypass device 7.

Herein, the first carrier C1 and the second carrier C2 are connected integrally with each other to be connected to the engine 1. One will appreciate that first and second carriers C1 and C2 may be monolithically formed. The input shaft INPUT is integrally connected with the first sun gear S1 coaxially. The second sun gear S2 is configured by a hollow body such that the input shaft INPUT penetrates the second sun gear S2, which is connected to the first sun gear S1.

Therefore, the first planetary gear device PG1 and the second planetary gear device PG2 may be configured compactly while first planetary gear device PG1 and the second planetary gear device PG2 are installed to be adjacent to each other, and as a result, the size and the weight of the transmission are ultimately reduced and the transmission is configured compactly. Therefore, mountability of the transmission can be improved and fuel efficiency of a vehicle can be improved.

The first friction element B1 is installed to restrict the rotation of the first ring gear R1 and the second friction element is installed to restrict the rotation of the second ring gear R2.

As the first friction element B1 to the third friction element B3, components that can reduce or restrict a rotational speed of a rotating body by using friction force, such as a wet multi disk type clutch may be used.

In the first planetary gear device PG1, when the rotation of the first ring gear R1 is restricted by the first friction element B1, the power from the engine 1 inputted into the first carrier C1 is accelerated through the first sun gear S1 to be drawn out to the input shaft INPUT.

In the second planetary gear device PG2, when the rotation of the second ring gear R2 is restricted by the second friction element B2, the power from the engine 1 inputted into the second carrier C2 is accelerated through the second sun gear S1 to be outputted to the output shaft OUTPUT.

In various embodiments, the bypass device 7 includes a bypass gear 7-1 rotatably installed on the output shaft OUT- PUT and connected to receive rotational force from the second sun gear S2 and a disconnection mechanism 7-2 configured to switch the bypass gear 7-1 connected directly to the output shaft OUTPUT by linear displacements formed on the output shaft OUTPUT.

As the disconnection mechanism 7-2, a dog clutch, a synchro-mesh device, or a friction clutch in the related art may be used.

Meanwhile, in order to implement a reverse shift step, a reverse idler shaft 15 is provided in parallel to the input shaft INPUT and the output shaft OUTPUT, a reverse idler gear 19 that meshes with a reverse driving gear 17 provided on the input shaft INPUT is rotatably installed on the reverse idler shaft 15, a reverse driven gear 21 is provided on the output shaft OUTPUT, a reverse transmission gear 23 of which rotation is restrained and which meshes with the reverse driven gear 21 is provided on the reverse idler shaft 15, and a reverse clutch device 25 configured to switch connecting and disconnecting the reverse idler gear 19 to and from the reverse idler shaft 15 by linear displacement on the reverse idler shaft 15 is provided on the reverse idler shaft 15.

Therefore, when the reverse clutch device 25 connects the reverse idler gear 19 to the reverse idler shaft 15, a rotation direction of the reverse driving gear 17 is reversed by the reverse idler gear 19 and the reverse transmission gear 23 to transmit rotational force of the reverse driving gear 17 of the input shaft INPUT to the reverse driven gear 21, thereby implementing the reverse shift step.

Of course, besides, the reverse shift step may be switched by installing a synchronization device for implementing a reverse step on the input shaft INPUT or the output shaft OUTPUT.

For reference, the shift step gear of various embodiments includes first to fifth shift step gears. The synchronization device 5 is provided between the first shift step gear and the second shift step gear of the output shaft OUTPUT, between the third shift step gear and the fourth shift step gear of the input shaft INPUT, or beside the fifth shift step gear of the input shaft INPUT.

An operation of the automated manual transmission configured as above will be described referring to FIGS. 2 to 6.

Figure 2:
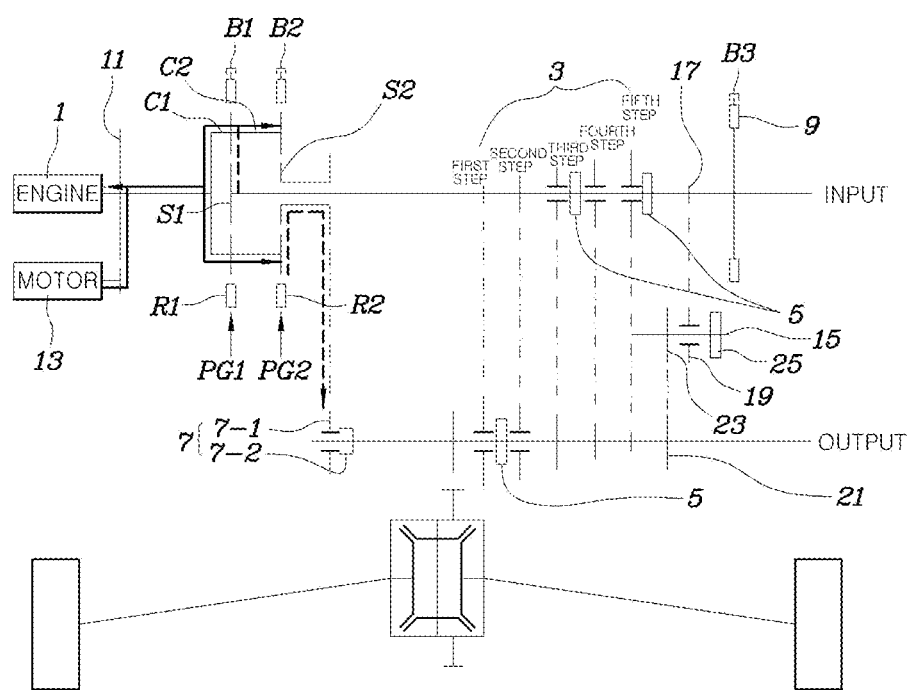
FIG. 2 is a diagram illustrating the flow of power at a start in the transmission of FIG. 1.
Figure 3:
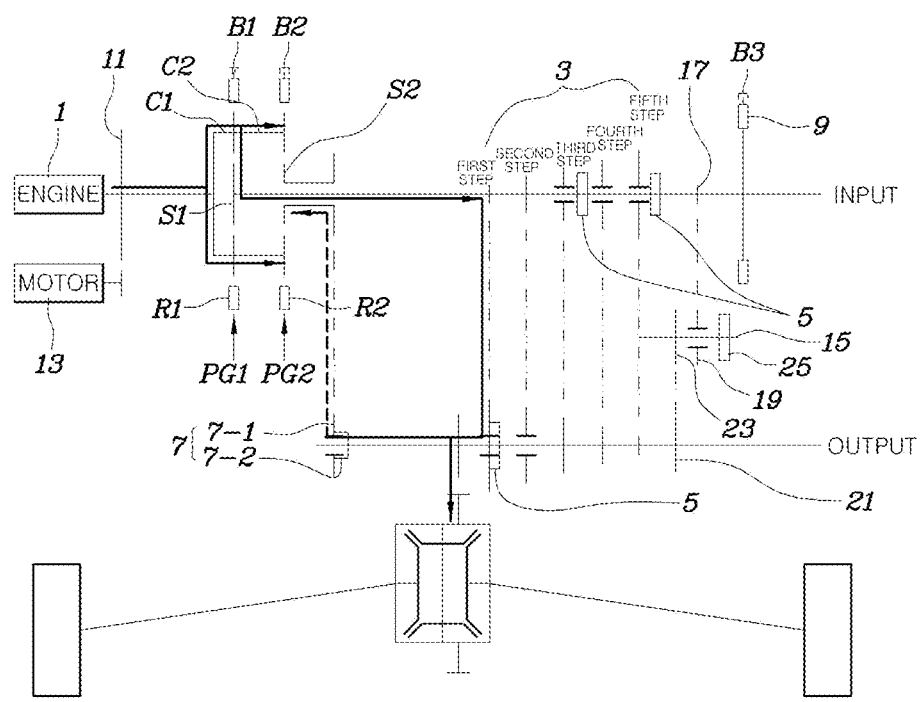
FIG. 3 is a diagram illustrating the flow of power when the transmission of FIG. 1 is in a first-step driving state.

FIG. 2 shows the flow of power in a start. While both the first friction element B1 and the second friction element B2 release the first ring gear R1 and the second ring gear R2 and the disconnection mechanism 7-2 of the bypass device 7 also releases the bypass gear 7-1 from the output shaft OUTPUT to interrupt power transmission between the second planetary gear device PG2 and the output shaft OUTPUT, when a driver steps a brake to suppress rotation of the output shaft OUTPUT, the ring gear 11 is rotated by driving the motor 13 to start the engine 1.

The rotational force to rotate the engine 1 rotates even the first carrier C1 and the second carrier C2 and since the first ring gear R1 and the second ring gear R2 are released, the rotational force transmitted to the first carrier C1 is branched through the first ring gear R1 and the sun gear S1 and the rotational force is transmitted to the input shaft INPUT connected to the first sun gear S1 and the rotational force transmitted to the second carrier C2 is branched through the second ring gear R2 and the second sun gear S2 and the bypass gear 7-1 that meshes with the second sun gear S2 also rotates, but the disconnection mechanism 7-2 is released, and as a result, the power is not transmitted to the output shaft OUPUT.

Herein, the driver steps the brake in the start to fix the output shaft OUTPUT and then, when the output shaft OUTPUT is fixed to fix the bypass gear 7-1 and the second sun gear S2, the rotational speed of the second ring gear R2 increases too rapidly to generate excessive rotation. Therefore, in order to prevent the rotational speed from increasing too rapidly, the bypass gear 7-1 is interrupted from the output shaft OUTPUT by using the disconnection mechanism 7-2.

While the engine 1 is started, the input shaft INPUT is slowly stopped by restraining the rotation of the rotation control plate 9 and the disconnection mechanism 7-2 is also connected with the output shaft OUTPUT, and the first shift step gear is connected to the output shaft OUTPUT by actuating the synchronization device 5 to perform a first-step shift.

Thereafter, while the input shaft INPUT is rotatable by releasing the third friction element B3, when the rotation of the first ring gear R1 of the first planetary gear device PG1 is restrained by actuating the first friction element B1, the power from the engine 1 is transmitted to the input shaft INPUT through the first sun gear S1 and the power is converted to a first-step shift ratio through the first shift step gear and thereafter, drawn out the output shaft OUTPUT to achieve first-step departure. See FIG. 3.

In this case, the rotational force of the output shaft OUTPUT is reversely transmitted to the second sun gear S2 through the bypass gear 7-1 and in this case, a rotational difference between the second sun gear S2 and the second carrier C2 is absorbed while the second ring gear R2 rotates.

Figure 4:
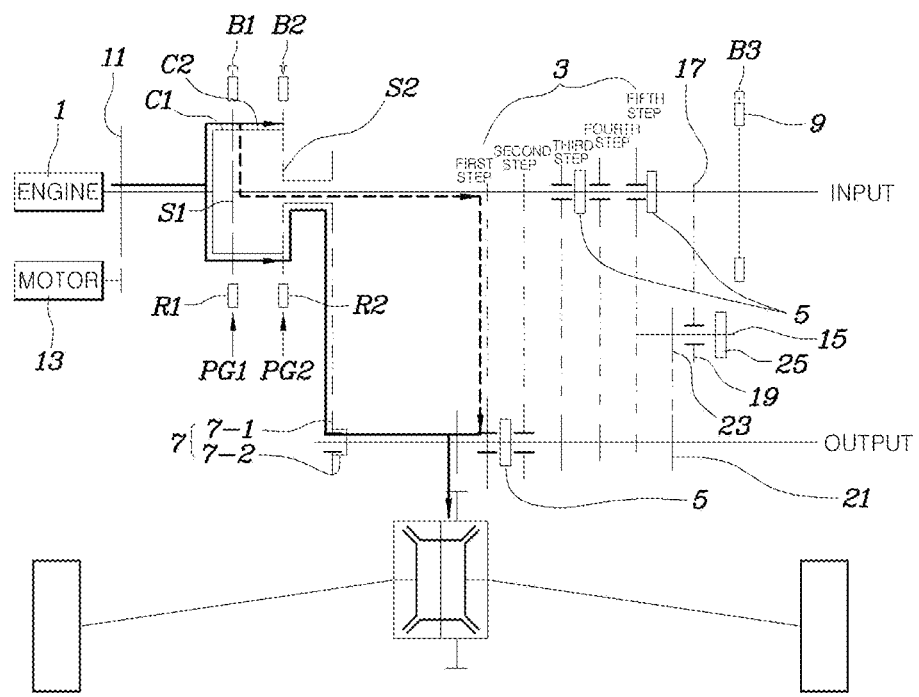
FIG. 4 is a diagram illustrating the flow of power while the transmission of FIG. 1 is shifted from a first step to a second step.
Figure 5:
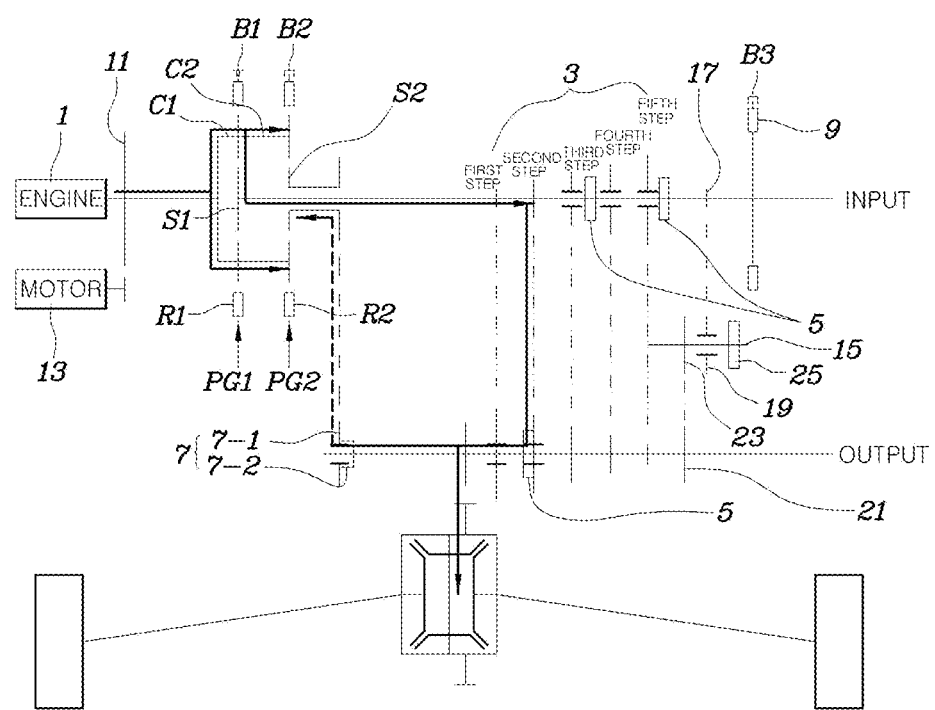
FIG. 5 is a diagram illustrating the flow of power when the transmission of FIG. 1 is in a second-step driving state.

Referring to FIG. 4, a shifting process from the first-step state to a second-step state will be described below. While the RPM of the input shaft INPUT is controlled by using the third friction element B3 and the rotation control plate 9, the second friction element B2 meshes while releasing the first friction element B1, and as a result, the power is transmitted to directly to the output shaft OUTPUT through not the first planetary gear device PG1 but the second planetary gear device PG2 and the bypass device 7. In this case, the first shift step gear is released and the second shift step gear is connected with the output shaft OUTPUT by moving the synchronization device 5.

Of course, a neutral state in which no gear is connected occurs while the first shift step gear is released and the second shift step gear meshes by using the synchronization device 5, but the power is transmitted to the output shaft OUTPUT through the second planetary gear device PG2 and the bypass device 7, and as a result, torque is not reduced during shifting.

Further, torque of the engine 1 transmitted through the second planetary gear device PG2 is controlled to be appropriate to the second step to thereby further improve torque stability of the output shaft OUTPUT.

When the operation is completed, the first friction element B1 meshes again while releasing the second friction element B2, and as a result, the power from the engine 1 is transmitted to the output shaft OUTPUT through the second shift step gear through the path in which the power passes through the first planetary gear device PG1 to thereby complete the second-step shift.

Figure 6:
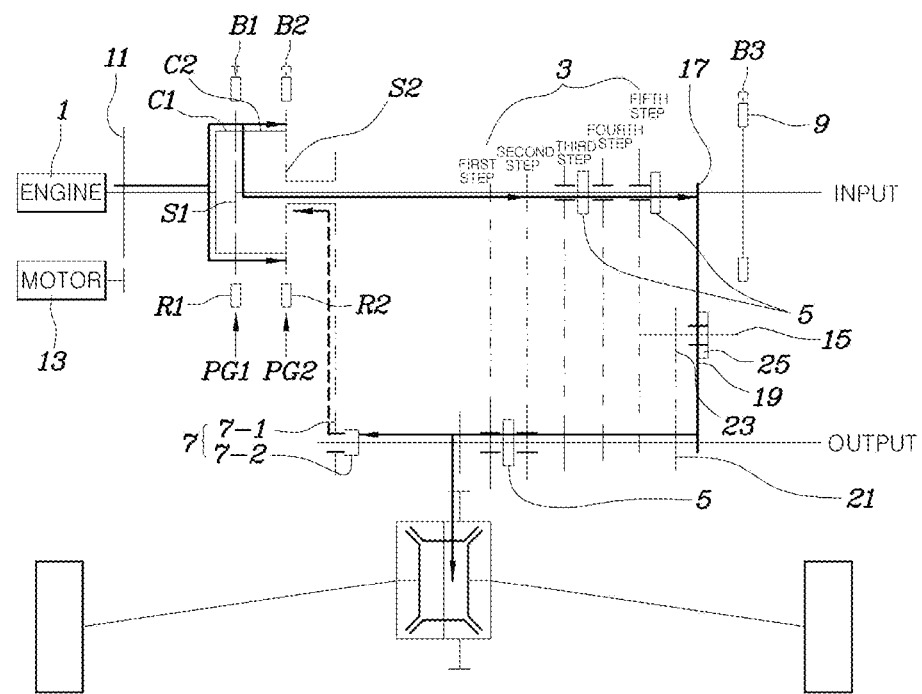
FIG. 6 is a diagram illustrating the flow of power when the transmission of FIG. 1 is in a backward driving state.

Since shifting processes of other shift steps are also performed in the same manner as the shifting process, detailed descriptions thereof will be omitted, however, an implementation state of a reverse step will be described referring to FIG. 6.

While the vehicle stops, the third friction element B3 stops the input shaft INPUT and the bypass device 7 connects the reverse idler gear 19 to the reverse idler shaft 15 by using the reverse clutch device 25 while the disconnection mechanism 7-2 disconnects the bypass gear 7-1 from the output shaft OUTPUT.

In the above state, when the first ring gear R1 is restrained by using the first friction element B1 while the rotational restraint of the input shaft INPUT is cancelled by releasing the third friction element B3, the power passes through the reverse driving gear 17, the reverse idler gear 19, the reverse transmission gear 23, and the reverse driven gear 21 in sequence while the input shaft INPUT rotates to drawn out a reverse output to the output shaft OUTPUT.

Herein, the reason for disconnecting the bypass gear 7-1 from the output shaft OUTPUT is that the second sun gear S2 and the output shaft OUTPUT are prevented from colliding with each other because the rotational direction of the second sun gear S2 of the second planetary gear device PG2 and the rotational direction of the output shaft OUTPUT are opposite to each other.

According to various embodiments of the present invention, merchantability of a vehicle can be improved by preventing a shift feeling deterioration phenomenon and forming a smooth and stable shift feeling by removing a torque decrease phenomenon caused during a shift by dualizing a transmission path of power supplied to drive the vehicle during the shift through a relatively simple and compact configuration while using a synchro-mesh type shift mechanism.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission, comprising:
    a first planetary gear device and a second planetary gear device, each including rotary elements receiving rotary force from an engine, respectively, and placed on a concentric axis;
    an input shaft provided to receive rotary force from the first planetary gear device;
    an output shaft parallel to the input shaft;
    a plurality of shift step gear pairs mounted on the input shaft and the output shaft to form different shift ratios;
    a plurality of synchronization devices provided to connect and disconnect any one shift step gear among the shift step gear pairs to the input shaft or output shaft;
    a bypass device provided to selectively connect the second planetary gear device to the output shaft;
    a first friction element provided to restrict rotation of rotary elements other than the rotary elements connected to the engine and the input shaft, respectively among the rotary elements of the first planetary gear device; and
    a second friction element provided to restrict rotation of rotary elements other than the rotary elements connected to the engine and the output shaft, respectively among the rotary elements of the second planetary gear device,
    wherein the first planetary gear device is configured by a single-pinion simple planetary gear device including a first sun gear, a first carrier, and a first ring gear,
    wherein the second planetary gear device is configured by a single-pinion simple planetary gear device including a second sun gear, a second carrier, and a second ring gear,
    wherein the first carrier and the second carrier are connected to the engine,
    wherein the first sun gear is connected to the input shaft,
    wherein a second gear is connected to the output shaft through the bypass device,
    wherein the first friction element is installed to restrict the rotation of the first ring gear,
    wherein the second friction element is installed to restrict the rotation of the second ring gear,
    wherein the first carrier and the second carrier are connected integrally with each other to be connected to the engine,
    wherein the input shaft is integrally connected with the first sun gear coaxially, and
    wherein the second sun gear is configured by a hollow body such that the input shaft penetrates the second sun gear, which is connected to the first sun gear.

2. The automated manual transmission of claim 1, wherein a rotation control plate that rotates integrally with the input shaft is provided on the input shaft and a third friction element provided to control the rotation of the input shaft by applying friction force to the rotation control plate is further provided on the input shaft.

3. The automated manual transmission of claim 1, wherein the bypass device includes:
    a bypass gear rotatably installed on the output shaft and connected to receive rotational force from the second sun gear; and
    a disconnection mechanism configured to switch the bypass gear connected directly to the output shaft by linear displacements formed on the output shaft.

4. The automated manual transmission of claim 1, wherein:
    a ring gear for starting the engine and forming rotary inertial force is provided on a rotational shaft of the engine, and
    a motor is connected to the ring gear.

5. An automated manual transmission in which placing shift step gears forming each shift step on an input shaft and an output shaft which are parallel to each other while making a pair and a synchro-mesh type synchronization device is provided, comprising:
    a first planetary gear device installed to transmit power from an engine to the input shaft;
    a second planetary device coaxially placed adjacent to the first planetary gear device and installed to transmit the power from the engine directly to the output shaft;
    a first friction element configured to be installed to control rotation of one rotary element of the first planetary gear device to control the power transmitted to the output shaft through the first planetary gear device;
    a second friction element configured to be installed to control rotation of one rotary element of the second planetary gear device to control the power transmitted to the output shaft through the second planetary gear device;
    a bypass device provided to selectively connect the second planetary gear device to the output shaft;
    a third friction element connected to the input shaft to control the rotation of the input shaft;
    a reverse idler shaft is provided in parallel to the input shaft and the output shaft, a reverse idler gear that meshes with a reverse driving gear provided on the input shaft is rotatably installed on the reverse idler shaft, a reverse driven gear is provided on the output shaft, a reverse transmission gear of which rotation is restrained and which meshes with the reverse driven gear is provided on the reverse idler shaft, and a reverse clutch device configured to switch connecting and disconnecting the reverse idler gear to and from the reverse idler shaft by linear displacement on the reverse idler shaft is provided on the reverse idler shaft.

6. The automated manual transmission of claim 5, wherein the bypass device includes:

a bypass gear rotatably installed on the output shaft and connected to receive rotational force from the second sun gear; and a disconnection mechanism configured to switch the bypass gear connected directly to the output shaft by linear displacements formed on the output shaft.

* * * * *